(12) United States Patent
Hirokawa et al.

(10) Patent No.: US 7,395,784 B2
(45) Date of Patent: Jul. 8, 2008

(54) PET TOILET

(75) Inventors: Satoshi Hirokawa, Toyama (JP); Orie Tani, Toyama (JP)

(73) Assignee: Richell USA, Inc., Arlington, TX (US)

( * ) Notice: Subject to any disclaimer, the term of this patent is extended or adjusted under 35 U.S.C. 154(b) by 260 days.

(21) Appl. No.: 11/134,964

(22) Filed: May 23, 2005

(65) Prior Publication Data

US 2005/0263089 A1     Dec. 1, 2005

(30) Foreign Application Priority Data

May 31, 2004     (JP) .............................. 2004-160505

(51) Int. Cl.
*A01K 29/00*     (2006.01)
(52) U.S. Cl. ...................... 119/165; 119/161
(58) Field of Classification Search ................. 119/161, 119/162, 165; 4/483, 485, 486
See application file for complete search history.

(56) References Cited

U.S. PATENT DOCUMENTS

| | | | |
|---|---|---|---|
| 2,741,223 A | | 4/1956 | Winbom, Jr. |
| 3,688,741 A | | 9/1972 | Thompson, et al. |
| 3,757,738 A | * | 9/1973 | Hall ............................ 119/162 |
| 3,762,369 A | | 10/1973 | Bamum |
| 3,990,397 A | | 11/1976 | Lowe, Jr. |
| 4,181,096 A | * | 1/1980 | Grubman .................... 119/162 |
| 4,271,544 A | | 6/1981 | Hammond |
| 4,457,029 A | * | 7/1984 | Matthews ...................... 4/237 |
| 5,103,772 A | * | 4/1992 | Schmid ....................... 119/162 |
| 5,477,569 A | * | 12/1995 | Porter ............................ 4/483 |
| 5,755,182 A | * | 5/1998 | Brown et al. ................. 119/166 |
| 6,341,386 B1 | * | 1/2002 | Phillips et al. ................. 4/484 |
| 6,487,989 B2 | | 12/2002 | Yamamoto |
| 6,701,539 B1 | * | 3/2004 | Hogan ............................ 4/235 |
| 2002/0078899 A1 | * | 6/2002 | Chiu .......................... 119/162 |

FOREIGN PATENT DOCUMENTS

| | | | |
|---|---|---|---|
| GB | 2232079 A | * | 12/1990 |
| JP | 6-36688 | | 9/1994 |
| JP | 3035415 | | 12/1996 |
| JP | 3056311 | | 11/1998 |
| JP | P2001-346472 A | | 12/2001 |
| JP | P2002-78428 A | | 3/2002 |
| JP | P2002-315463 A | | 10/2002 |

* cited by examiner

*Primary Examiner*—Kimberly S Smith
(74) *Attorney, Agent, or Firm*—Michael W. Piper; Conley Rose, P.C.

(57) ABSTRACT

A pet toilet that prevents scattering of litter material or tracking of litter material into the home is disclosed. The pet toilet comprises a toilet body having a box portion for containing sand or litter, a seat having a floor defining an opening so that dung and urine may pass from the animal to the sand. The seat is removably mounted on the upper opening of the box portion, and the seat may be lifted from a first position to a second position. Preferably, the seat structure defines a plurality of holes. These holes encourage sand to return to the box rather than to be tracked into the house. The toilet may be used without the seat for small pets such as kittens and still provides advantages to prevent the scattering of sand or litter during digging.

32 Claims, 4 Drawing Sheets

挿入方向

PET TOILET

CROSS-REFERENCE TO RELATED APPLICATIONS

This application claims priority under 35 U.S.C. § 119 to Patent Application Serial No. 2004-160505, entitled Pet Toilet, filed with the Japan Patent Office on May 31, 2004, under the Paris Convention for the Protection of Industrial Property.

STATEMENT REGARDING FEDERALLY SPONSORED RESEARCH OR DEVELOPMENT

Not applicable.

REFERENCE TO A MICROFICHES APPENDIX

Not applicable.

FIELD OF THE INVENTION

The present invention relates to a pet toilet, particularly for cats confined to the home.

BACKGROUND OF THE INVENTION

Domesticated pets are often confined to the home by their owners, and therefore some provision must be made to receive their natural excrement so that the home is not soiled. Domesticated cats in particular are often provided with litter boxes for this purpose; however, some owners object to the litter or sand being tracked into the rest of the house on the feet of the pets. As used herein, sand refers to sand, cat litter, or other material useful for pet waste collection. Some solutions to these problems have been proposed in the past. Japanese Application (Publication No. 2002-78428) discloses a pet toilet comprising an outer container having a top opening, inner container, a mesh structure at the center on its bottom to be installed inside the outer container, and a cover having a hole for excretion at the center, to be mounted on the top opening of the inner container. This 2002 Japanese application asserts that using the pet toilet disclosed, a cat's feet are not stained with sand because the cat stands on the cover for excretion.

Behaviorally, however, a cat will typically dig sand before and after excretion. Accordingly, a cat standing on the cover will extend its paw into the sand in the inner container through the hole for excretion and dig the sand. Accordingly, the cat's paw will catch sand, and the sand will also likely be transferred onto the cover. If sand is transferred onto the cover, the cat can step in it and likely track it into the room. The application therefore discloses that it is necessary not to allow any sand to remain on the cover. In order to get rid of this problem, the sand remaining on the cover is to be returned to the sandbox by tilting the cover or by using a brush (see the 2002 Application, paragraph 0032). To tilt the cover, however, the cover needs to be removed, which is troublesome. It is also troublesome if the sand needs to be brushed back into the sandbox upon each excretion.

In addition, the cover needs to be removed each time the dung and urine discharged in the inner container is cleared or sand is replaced, and the removed cover is normally placed on the floor of the room on that occasion. This, however, causes the sand collected on the cover to spill and foul the room.

Therefore, there is a need for a device which will further reduce or eliminate sand or litter from being tracked into a room after pet defecation or urination.

SUMMARY OF THE INVENTION

In one embodiment, a pet toilet is disclosed which has a toilet body having a body peripheral wall having an outside and an inside. A box portion is provided adjacent the inside of said body peripheral wall for containing sand. The box portion has a bottom sand-receiving area, a box peripheral wall adjacent to the bottom area and extending upward to a box upper surface defining a box upper opening. The pet toilet has a seat which has a floor defining a generally central seat opening which seat opening permits excreted dung or urine from a pet user to fall down into any sand placed in the box. The seat is removably mounted on the box upper surface defining a box upper opening. The seat can be lifted up from said first use position to a second upright position.

In another embodiment, the seat has a front portion, a central portion, and a rear portion, and a projecting piece is located on the rear portion so that a gap is defined between said projecting piece and the center portion of the seat. The projecting piece serves as a turning fulcrum and as a support for the seat when it is lifted up from a first position to a second position.

In a third embodiment, the pet toilet further comprises an upright piece located on the box upper surface. The upright piece protrudes upward and obliquely backwards toward the rear of said toilet body and functions to hold the seat upright when the seat is lifted up to the second position.

In a fourth embodiment, the pet toilet further comprises a spring preventing piece located on the peripheral wall of the toilet body above the box upper surface at a specified distance from the box upper surface, and toward the rear of the box portion. The spring preventing piece prevents the seat from springing up during use.

In an alternate embodiment, the pet toilet contains all of the elements of the embodiments above.

In an alternate embodiment, the pet toilet has no seat, but comprises a toilet body having a body peripheral wall having an outside and an inside. It also has a box portion provided adjacent the inside of said body peripheral wall for containing sand. The box portion has a bottom sand-receiving area, a box peripheral wall adjacent to the bottom area and extending upward to a box upper surface defining a box upper opening. The box peripheral wall extends upward so that sand or litter is contained in the toilet body during use or digging by a pet. A step is formed on the front end of said box portion.

Another embodiment concerns a seat for use in a pet toilet, comprising a top side and a bottom side, a periphery defining an opening through which animal excrement may pass during use, and a plurality of holes which permit sand transferred to the top side of said seat to fall through said seat. Preferably the holes in the seat have a top portion and a bottom portion circumferential wall made arcuate from said top portion to said bottom portion.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE INVENTION

The present invention disclosure provides a pet toilet that helps to retain sand in the toilet and reduces or eliminates tracking of sand or litter into the house. The design of the device discourages cats or other pets from contacting the sand directly, and also provides structure that reduces or eliminates sand caught by a cat's paw (if they do dig before or after excretion), from being tracked into or spilled in the home.

A pet toilet according to the present disclosure comprises a toilet body having a box portion for containing sand, a seat having an opening to permit passing of dung and urine from the animal to the sand in the box portion, said seat mounted on the upper opening of the box portion, and a mounting structure enabling the seat to be lifted up to a second position while its periphery is supported by the toilet body.

In addition, the pet toilet may be further equipped with a retainer enabling the seat to be held upright when it is lifted up to said second position.

In addition, the mounting structure supports the seat so it can be mounted and dismounted on and from the toilet body smoothly.

Figure 1:
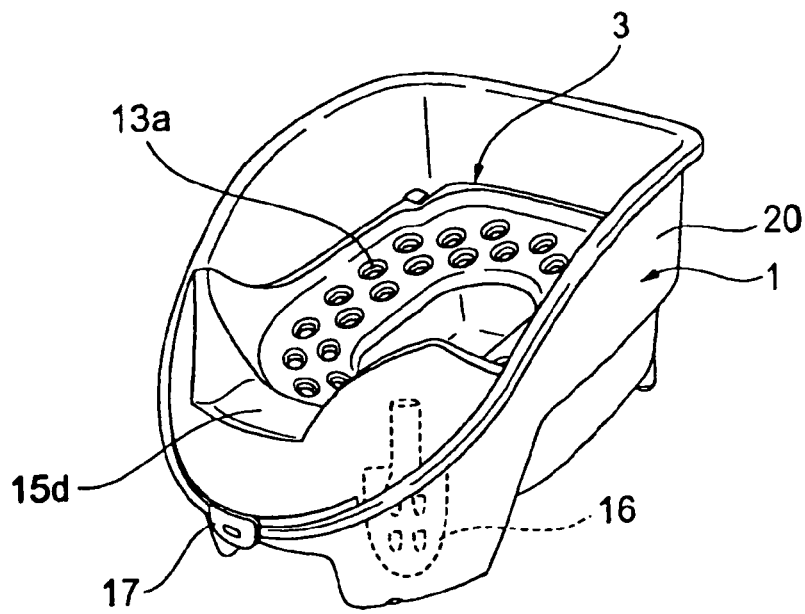
FIG. 1 is an oblique view of the pet toilet according to an embodiment of the present invention.
Figure 2:
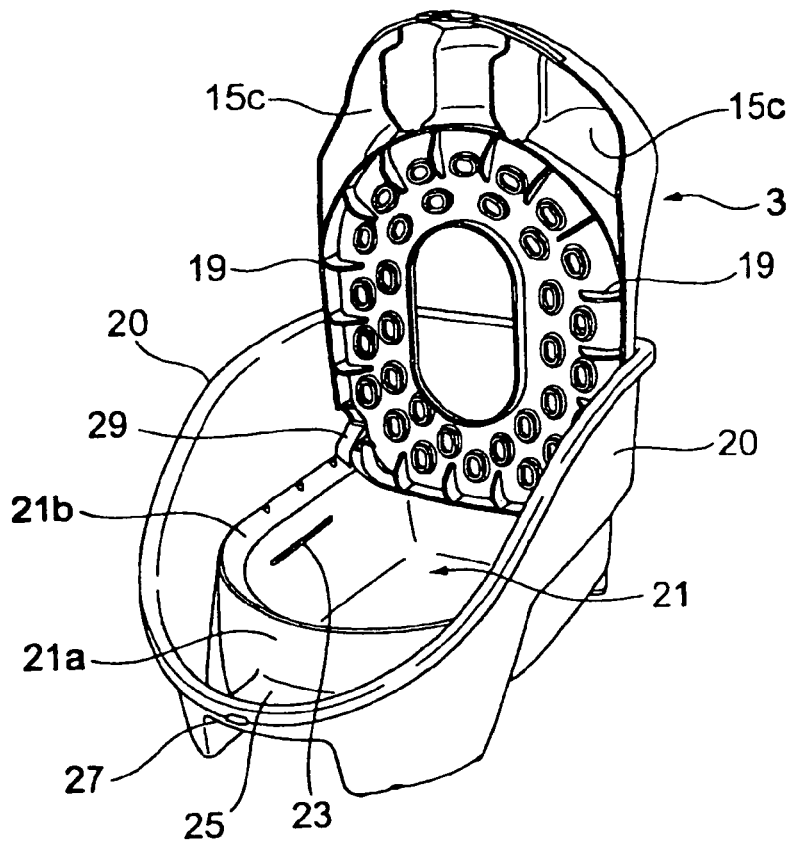
FIG. 2 is an oblique view of the pet toilet according to an embodiment of the present invention, with its seat turned upright.

In addition, the mounting structure comprises a support which, when installed on the periphery of the seat in contact with the upper surface of the side wall of the box portion, supports the lifting of the seat from a first position (such as illustrated in FIG. 1 for a preferred embodiment) to a second position (such as illustrated in FIG. 2 for a preferred embodiment). A stopper (such as illustrated as component 29 in FIG. 2 for a preferred embodiment) which, formed on the upper surface of the side wall of the box portion, restricts the movement of the seat when lifted to the second position.

In addition, the pet toilet is preferably provided with a spring preventing portion for preventing the seat from springing up near the mounting structure of the toilet body.

In addition, the pet toilet is preferably provided with a guide means on the back of the seat so that, when installing the seat on the box portion of the toilet body, the seat is guided along the upper surface of the side wall of the box portion and installed at a specified position. In one embodiment the guide means guides the seat, when being installed at a specified position, so that a part of the periphery of the seat comes under the spring preventing portion.

In addition, the guide means may be comprised of ribs for reinforcement provided on the back of the seat.

The disclosure herein of a pet toilet permits any sand remaining on the seat to be returned easily back to the sandbox by lifting the seat from a first position to a second position. The structure disclosed comprises a toilet body having a box portion for containing sand, a seat having an opening for passing dung and urine from the animal using the device to the sand contained in said box portion. The seat is mounted on the upper opening of the box portion, and a mounting structure supports the periphery of the seat when it is on the toilet body lifted from a first position to a second position.

In addition, the pet toilet is equipped with a retainer enabling the seat to be held upright, and while the seat is held upright, sand can be replaced without dismounting (removing) the seat.

FIG. 1 is an oblique view of a toilet for a pet according to an embodiment of the present disclosure that is constructed suitable for cat. As shown in FIG. 1, the toilet for a pet of this embodiment comprises a toilet body 1 containing a box portion for containing the sand (for receiving cat excrement and urine) and seat 3 installed on the top opening of the box portion. As shown in FIG. 2, the seat 3 is mounted on the toilet body 1 with a mounting structure so that the rear portion is supported on the toilet body enabling it to be moved from a first position in FIG. 1 to a second position in FIG. 2 and which enables a user to mount or dismount seat 3 smoothly.

Each construction is described hereunder in detail.

Figure 3:
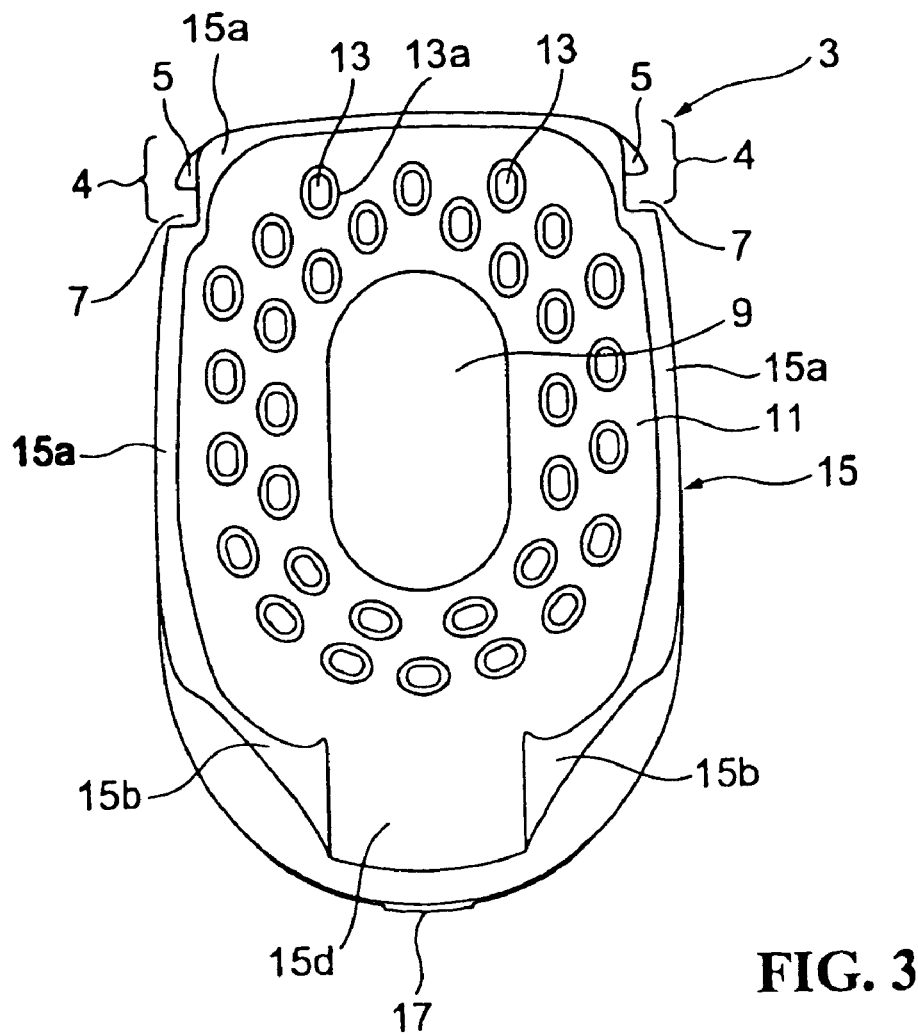
FIG. 3 is a plan view of the seat of the pet toilet according to an embodiment of the present invention.
Figure 4:
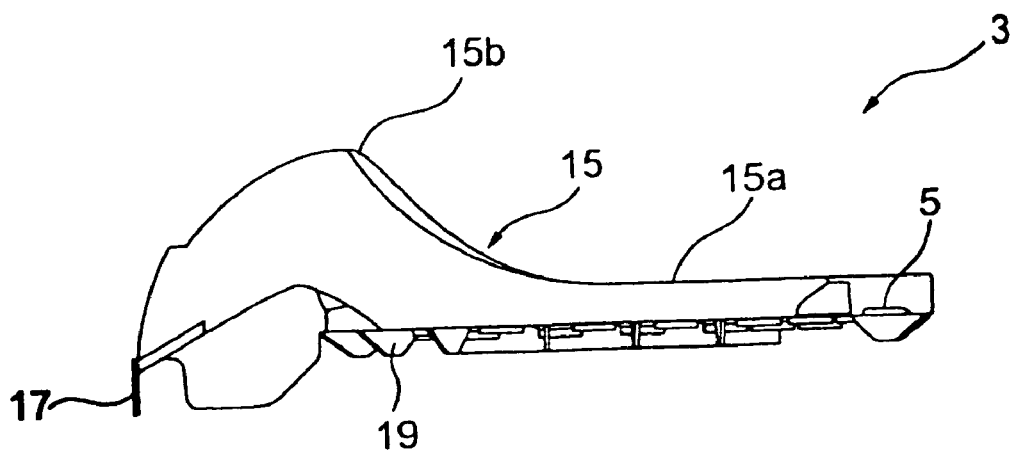
FIG. 4 is a side view of the seat of the pet toilet according to an embodiment of the present invention.

FIG. 3 is a plan view of the seat 3 and FIG. 4 is a side view. The seat 3 has a nearly oval shape as shown in FIG. 3 and a narrowed portion 4 is formed on a part of the rear end. A projecting piece 5, made of a nearly quarter of a disc of flat plate projecting outwards from the seat 3, is provided at about a half position of the rear end of the narrowed portion 4 on both sides. Accordingly, in a plan view shown in FIG. 3, the projecting piece 5 and gap 7 are formed at the narrowed portion 4 on the rear end of the seat.

In addition, an oval opening 9, for dung and urine to fall down from the pet in use, is formed at the center of the seat 3. A floor 11 for a cat to stand on is formed around the opening 9. It is preferable that this floor 11 is slightly sloped down towards the opening 9 so that the sand on the floor 11 will not scatter outside when the seat 3 is held upright. The floor 11 is provided with multiple holes 13 for the sand to fall down into the box. The circumferential wall 13a of each hole 13 is made arcuate from the top to the bottom (see FIG. 1) so that a cat's paw is not caught in the holes.

A peripheral wall 15 is formed around the floor 11. The peripheral wall 15 comprises a low wall from the center to the rear end of the seat 3 and hill-shaped high wall 15b gradually rising from the center to the front end (see FIG. 4). When the seat 3 is mounted on the toilet body 1, the high wall 15b continues with the peripheral wall of the toilet body 1 and so the seat 3 is surrounded entirely as shown in FIG. 1. Thus, even if sand scatters as a cat digs the sand, scattering outside the toilet can be prevented. In addition, an empty space 15c is formed inside the back of the high wall 15b as shown in FIG. 2 and this space along with a space in the toilet body can be utilized as a storage space for tools such as scoop 16 while the seat 3 is mounted in place (see FIG. 1).

A level portion 15d is provided at the center of the front end of the peripheral wall, that is, at a portion between the high walls 15b on both sides. In use, a cat may step on this level portion 15d with its front feet while excreting. By providing a level portion 15d between the high walls 15b on both sides like the above, a cat steps on the level portion 15d with its front feet (even if the cat attempts to step on the side wall 15b, its feet slip down because of the slope and it steps on the level portion 15d in the end) while excreting and so the posture of the cat while excreting is controlled, and accordingly dung and urine are expected to fall into the opening 9. A hook 17 is provided on the front end of the seat 3 for hooking and fastening the seat with the toilet body when mounted.

On the back of the floor 11 of the seat 3, multiple ribs 19 are provided radially as shown in FIG. 2. These multiple ribs are for reinforcing the floor 11 and also for functioning as guide members for placing the seat 3 on a specified position of the toilet body 1 when mating with the peripheral wall around the box portion of the toilet body. In particular, the rib 19 in the front functions to push the seat backward when it contacts with the peripheral wall of the opening of the toilet body.

The toilet body 1 comprises a peripheral wall 20 and box portion 21, formed like a frame with bottom, provided at the center inside the wall for containing sand.

The top edge of the peripheral wall 20 has a nearly oval shape with its rear end, having nearly the same shape as the seat in the side view, being nearly straight as shown in FIG. 2.

The peripheral wall 21a of the box portion 21 has a specified height so that a specified amount of sand can be contained, and a target level line 23 is provided on its inside showing a target amount of sand. The top edge of the peripheral wall 21a corresponds to the peripheral shape of the floor 11 of the seat 2. In addition, the top surface of the peripheral wall 21a has a sloped surface 21b sloping down towards the inside as shown in FIG. 2. By making the top surface of the peripheral wall 21a (particularly the top surface of the rear end) sloped, it becomes possible to prevent the sand sliding down from the seat 3, when the seat is moved to the second (upright) position, from being stagnated there.

In addition, a step 25 is provided on the center of the front end of the toilet body 1. This step 25 serves as a feet step for a cat to step into the toilet when used without a seat or for a small cat or kitten to step into the toilet easily.

A catch 27 for hooking the hook 17 of the seat 3 is provided on the front end of the toilet body 1.

Figure 5:
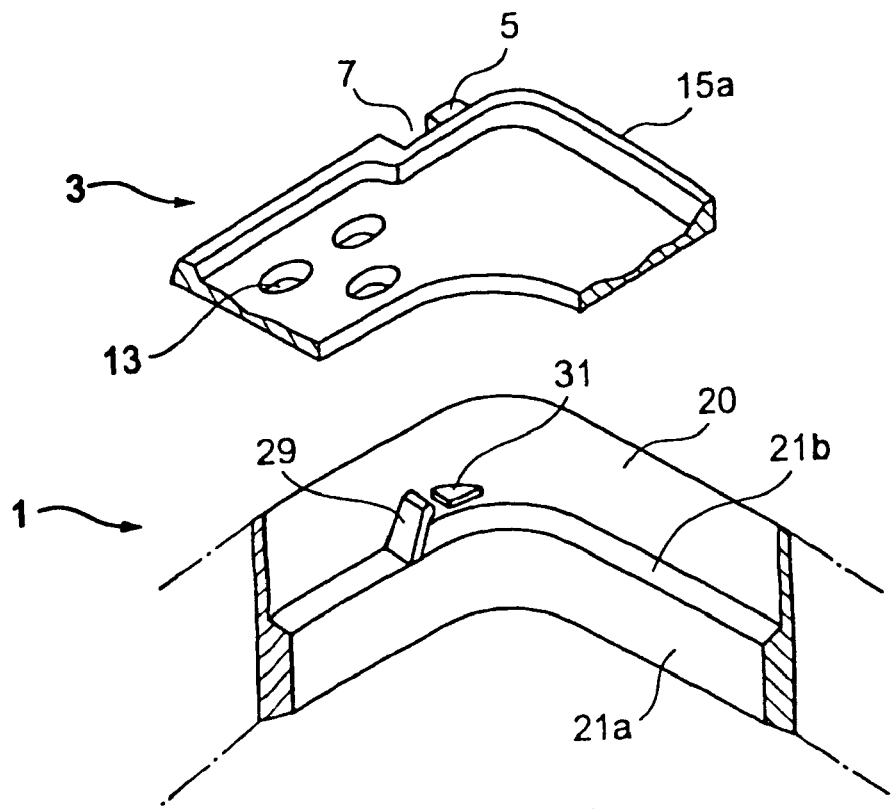
FIG. 5 is an explanatory figure of the seat mounting structure of the pet toilet according to an embodiment of the present invention (part 1)

FIG. 5 explains the mounting structure of the seat, showing a rear part of the toilet body 1 and a rear part of the seat 3.

As parts constituting the mounting structure, there are provided an upright piece 29 protruding upwards and obliquely backwards on the sloped surface 21b at the rear of the toilet body 1 and a spring preventing piece 31, made of a nearly quarter of a disc, behind the upright piece 29 above the sloped surface 21b and at a specified distance from the sloped surface 21b.

As parts constituting the mounting structure on the seat 3, there are provided the projecting piece 5, made of a nearly quarter of a disc of flat plate, on both sides of the narrowed portion 4 on the rear of the seat 3 and the gap 7 formed in front of the projecting piece 5 as afore-mentioned in explaining the construction of the seat 3.

The effect of the mounting structure of the seat as constructed above is described hereunder.

Figure 6:
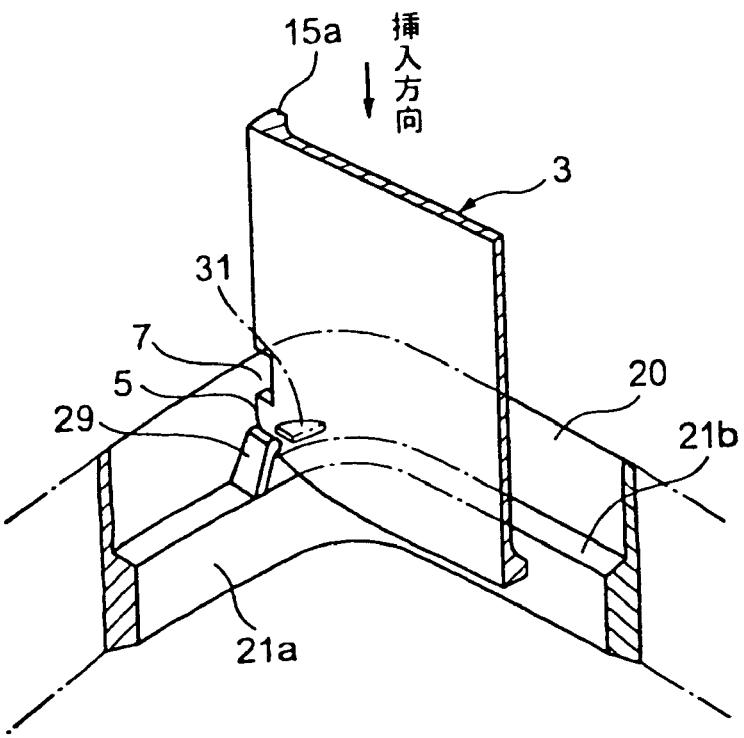
FIG. 6 is an explanatory figure of the seat mounting structure of the pet toilet according to an embodiment of the present invention (part 2)

To mount the seat 3, hold the seat 3 upright with its rear end downward as shown in FIG. 6 and insert the projecting piece 5 into a gap between the upright piece 29 and spring preventing piece 31 as shown in FIG. 6. When the seat 3 as inserted is put against the rear wall of the toilet body 1 as shown in FIG. 2, the projecting piece 5 contacts with the neck of the upright piece 29 as shown in FIG. 6 and thereby its forward movement is restricted and the seat is supported. In other words, the seat 3 is held slightly at a backwards tilt as a result of the contact of the projecting piece 5 with the upright piece 29 and support by the rear wall of the toilet body 1, and so the upright piece 29 and rear wall of the toilet body 1 serve as the retainer of the present pet toilet.

Although the rear wall of the toilet body 1 serves as the retainer in this embodiment, it is permissible to provide a standing piece on the top of the spring preventing piece so that the standing piece functions as the retainer in place of the rear wall.

Figure 7:
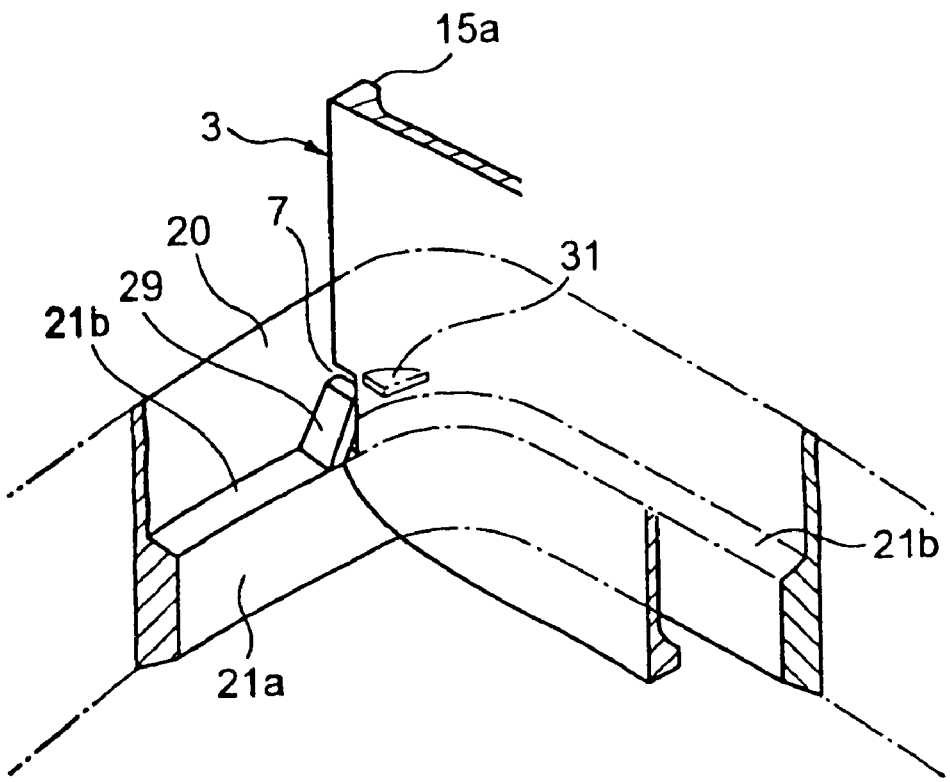
FIG. 7 is an explanatory figure of the seat mounting structure of the pet toilet according to an embodiment of the present invention (part 3)
Figure 8:
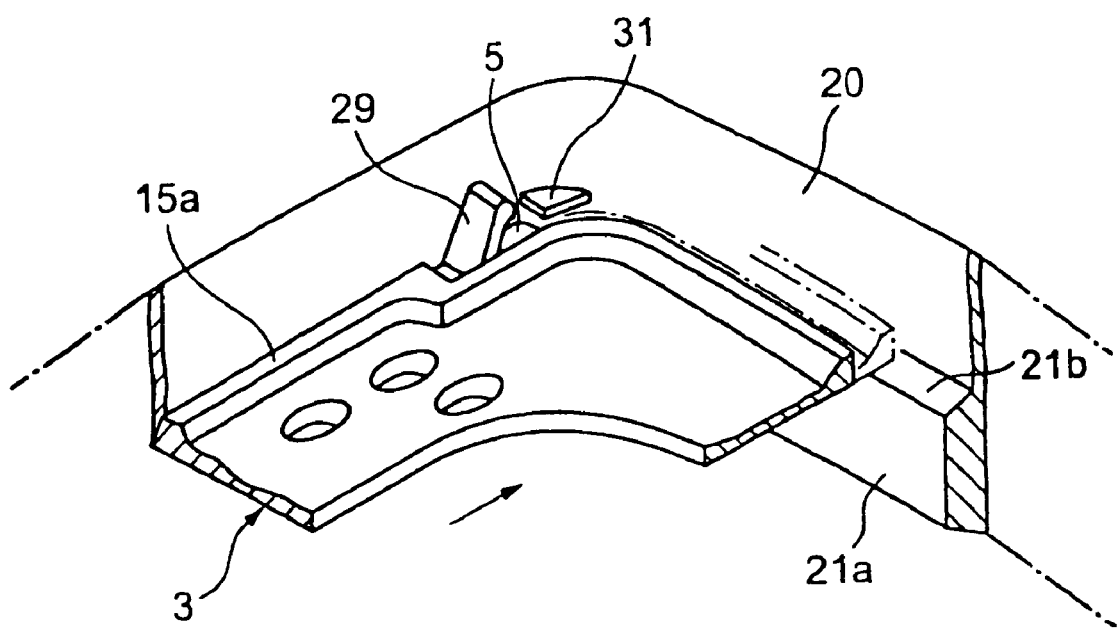
FIG. 8 is an explanatory figure of the seat mounting structure of the pet toilet according to an embodiment of the present invention (part 4).

To set the toilet from a state shown in FIG. 2 to the usage state shown in FIG. 1, the seat 3 needs to be moved forward using the projecting piece 5 on its rear end as the turning axis. Because the upright piece 29 goes through the gap 7 as the seat is moved forward as shown in FIG. 7, the seat can be moved forward. When the seat 3 is moved to the down (first) position, the rib 19 provided on the back of the seat front contacts with the sloped surface 21b of the toilet body 1. When the seat 3 is pushed downward, the rib 19 receives a backward force from the sloped surface 21b and accordingly the seat 3 moves backwards in relation to the toilet body 1. Consequently, the projecting piece 5 of the seat 3 contacts the rear wall of the toilet body 1 as shown by a broken line in FIG. 8 and hence the seat 3 is set on the toilet body 1. When this occurs, the projecting piece 5 creeps under the spring preventing piece 31, and accordingly the rear end of the seat 3 can be prevented from springing up from the toilet body 1 in case a cat jumps onto the front of the seat.

When the seat 3 is set at a specified position, the hook 17 provided on the front end of the seat 3 is fastened with the catch 27 on the toilet body 1. Thus, the seat 3 is restricted of its movement at the rear end and is firmly held on the toilet 1.

To dismount (remove) the seat 3, the hook at the front end is unfastened, the seat lifted up at its front end, and the seat lifted up to the second position (as best illustrated in FIG. 2) using the projecting piece 5 as the turning axis.

Since the projecting piece 5 serving as a turning fulcrum is arcuate and the top surface of the peripheral wall 21a with which the projecting piece 5 contacts is a sloped surface 21b sloping down towards the inside, the turning fulcrum (contact between the projecting piece and sloped surface 21b) moves downward as the cover is turned. Accordingly, the projecting piece 5 in no way interferes with the spring preventing piece 21.

When the front end of the seat 3 is pulled up after it has been lifted up to some extent, the seat 3 can be dismounted from the toilet body 1.

The use of the toilet for a pet according to this embodiment constructed above is described hereunder.

When this pet toilet is used for a kitten, it is difficult to use it with the seat 3. Accordingly, the toilet may be used without the seat 3. In this case, since the kitten can step onto the step 25 formed on the front end of the toilet body 1, and enter the sandbox easily. Since the peripheral wall 20 of the toilet body 1 is very high, scattering the sand outside the toilet can be prevented.

When the toilet is used with the seat 3, the seat 3 is mounted on the toilet body 1 as described above. When a cat excretes dung and urine in the toilet with the seat 3 mounted, the cat puts its feet on the level portion 15d. Consequently, the posture of the cat is controlled and dung and urine always falls into the sand box through the opening 9.

Even if the cat digs the sand before or after excretion, the sand will not scatter outside the toilet because it is contained down in the box portion 21 beneath the seat 3. Sand may remain on the seat in some cases but, by lifting up the seat 3 using the projecting piece 5 as the turning axis and putting it against the toilet body as shown in FIG. 2, the sand on the seat will fall down to the sandbox through the gap between the seat 3 and rear wall of the box portion 21. In removing dung and urine from the sandbox or replacing the sand, nothing but turning the seat upright as shown in FIG. 2 is needed. Since dismounting the seat and placing it on the floor as needed in a prior art is no longer necessary, scattering or tracking sand into the room can accordingly be prevented.

The mounting structure of the present invention is not limited to what is shown in FIG. 5 but any structure that allows the seat to be moved to a second position while its rear end is supported by the toilet body can be used, including various types of structures. For example, there is available a structure where a vertical oblong hole is provided on the top surface of the peripheral wall 21a of the box portion 21 of the toilet body 1 and a turning axis provided protruding outwards on each side of the seat rear end is inserted into this hole.

In addition, although the above embodiment shows a case where a mounting structure is provided on the rear end of the seat 3, the present invention is not limited to the above. Alternatively, the mounting structure may be provided on the side of the seat and the seat lifted up toward the side. The position of the mounting structure may be modified to be on the rear or side according to the shape of the seat or toilet body.

In addition, although the preferred embodiment has a spring preventing piece 31 provided on the toilet body as a spring preventing portion for preventing the rear end of the seat 3 from springing up, alternatives may be used. In one alternative, recessed portion recessing backward is provided on the back wall of the toilet body instead of the spring preventing piece 31 so that the rear end of the seat 3 is inserted into the recessed portion as the seat 3 is returned to a first position from a second position (lifted up position) (usage state).

In the preferred embodiment, the upright piece 29 is provided as a stopper member on the sloped surface 21b of the box portion 21 so that the upright piece 29 is inserted into the gap 7 when the seat is in the usage state. The upright piece 29 therefore has a function of controlling the position of the seat 3.

Naturally, if the stopper member is only for functioning to control the movement of the rear end of the seat while the seat 3 is put against the rear in a second position (lifted up), another embodiment may be employed. In an alternative, a protrusion lower than the highest portion of the sloped surface 21b and provided near the lowest portion of the sloped surface 21b is employed. Since a protrusion like this will not interfere with the seat 3 when the seat is moved from a second position to a first position (usage state) no gap 7 is needed.

Although the pet toilet has been illustrated primarily in reference to cats, small or medium dogs or other household pets capable of using a litter box, such as ferrets, rabbits, or other pets may be trained to use the pet toilet disclosed.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

We claim:

1. A pet toilet, comprising:
   a toilet body having a body peripheral wall having an outside and an inside;
   a container portion provided inside of said body peripheral wall for containing sand, said container portion having a bottom sand-receiving area, a container peripheral wall extending from said bottom area and upward to a container upper surface defining a container upper opening;
   a seat having a floor defining a generally central seat opening which seat opening permits excreted dung or urine from a pet user to fall down into any sand placed in the container portion, said seat removably mounted on said container upper surface, and which seat can be lifted up from a first use position to a second upright position;
   wherein said seat has a front portion, a central portion, and a rear portion, said seat further comprising a projecting piece located on said rear portion so that a gap is defined between said projecting piece and said central portion of said seat, said projecting piece serving as a turning fulcrum and as a support for the seat when it is lifted up from said first position to said second position; and
   an upright piece located on said container upper surface, said upright piece protruding upward and obliquely backwards toward the rear of said toilet body, said upright piece functioning to hold said seat upright when said seat is lifted up to said second position.

2. The pet toilet according to claim 1, further comprising a spring preventing piece located on the peripheral wall of the toilet body above the container upper surface at a specified distance from said container upper surface, and toward the rear of said container portion, said spring preventing piece preventing the seat from springing up during use.

3. The pet toilet according to claim 2, further comprising a guide means on the back of the seat adapted to be contacted by the container peripheral wall at a specified position, whereby a portion of the periphery of the seat back portion is pushed under the spring preventing portion when the guide means is positioned to contact said peripheral wall.

4. The pet toilet according to claim 3, wherein the guide means is one or more ribs for reinforcement provided on the back of the seat.

5. The pet toilet according to claim 4, further comprising a level portion at the center of the front end of the peripheral wall suitable for a pet user to place its feet upon during use.

6. The pet toilet according to claim 5, further comprising a fastener on the front portion of the seat and a complementary fastener on the front of the toilet body for fastening the seat with the toilet body when mounted.

7. The pet toilet according to claim 4, wherein said seat has a top side and a bottom side, and a plurality of holes in said floor which permit sand transferred to the top side of said seat to fall through said seat bottom side to said container portion.

8. The pet toilet according to claim 4, wherein said floor is slightly sloped down toward said seat opening.

9. The pet toilet according to claim 4, wherein said seat has a seat peripheral wall formed around the floor and which comprises a low wall from the center to the rear of the seat and a hill-shaped high wall gradually rising from the center to the front end, said high wall continuing with the container peripheral wall of the toilet body when the seat is mounted in said first position so that the seat is surrounded entirely.

10. The pet toilet of claim 4, wherein said container upper surface slopes down toward the inside of said container portion.

11. The pet toilet according to claim 3, wherein the container portion is separate from the inside of the body peripheral wall.

12. The pet toilet according to claim 3, wherein said seat has a top side and a bottom side, and a plurality of holes in said floor which permit sand transferred to the top side of said seat to fall through said seat bottom side to said container portion.

13. The pet toilet according to claim 3, wherein said floor is slightly sloped down toward said seat opening.

14. The pet toilet according to claim 3, wherein said seat has a seat peripheral wall formed around the floor and which comprises a low wall from the center to the rear of the seat and a hill-shaped high wall gradually rising from the center to the front end, said high wall continuing with the container peripheral wall of the toilet body when the seat is mounted in said first position so that the seat is surrounded entirely.

15. The pet toilet of claim 3, wherein said container upper surface slopes down toward the inside of said container portion.

16. A pet toilet, comprising:
a toilet body having a body peripheral wall having an outside and an inside;
a container portion provided adjacent and separate from said inside of said body peripheral wall for containing sand, said container portion having a bottom sand-receiving area, a container peripheral wall adjacent to said bottom area and extending upward to a container upper surface defining a container upper opening; and
a seat having a floor defining a generally central seat opening which seat opening permits excreted dung or urine from a pet user to fall down into any sand placed in the container portion. said seat removably mounted on said container upper surface, and which seat can be lifted up from a first use position to a second upright position;
wherein said seat has a seat peripheral wall formed round the floor and which comprises a low wall from the center to the rear of the seat and a hill-shaped high wall gradually rising from the center to the front end, said high wall continuing with the container peripheral wall of the toilet body when the seat is mounted in said first position so that the seat is surrounded entirely.

17. The pet toilet according to claim 16, wherein said seat has a top side and a bottom side, and a plurality of holes in said floor which permit sand transferred to the top side of said seat to fall through said seat bottom side to said container portion.

18. The pet toilet according to claim 17, wherein said holes have a top portion and a bottom portion and a circumferential wall made arcuate from said top portion to said bottom portion.

19. The pet toilet according to claim 16, wherein said floor of said seat is formed near said seat opening. and wherein said floor is slightly sloped down toward said seat opening.

20. The pet toilet of claim 19, in which an empty space is formed inside the back of the hill-shaped high wall, which along with a space in the toilet body, forms a storage space for tools.

21. The pet toilet of 18, in which an empty space is formed inside The back of the hill-shaped high wall, which along with a space in the toilet body, forms a storage space for tools.

22. The pet toilet according to claim 17, wherein said floor of said seat is formed near said seat opening. and wherein said floor is slightly sloped down toward said seat opening.

23. The pet toilet of claim 22, in which an empty space is formed inside the back of the hill-shaped high wall, which along with a space in the toilet body, forms a storage space for tools.

24. The pet toilet of claim 17, in which an empty space is formed inside the back of the hill-shaped high wall, which along with a space in the toilet body, forms a storage space for tools.

25. The pet toilet according to claim 16, wherein said floor of said seat is formed near said seat opening, and wherein said floor is slightly sloped down toward said seat opening.

26. The pet toilet of claim 25, in which an empty space is formed inside the back of the hill-shaped high wall, which along with a space in the toilet body, forms a storage space for tools.

27. The pet toilet of claim 16, in which an empty space is formed inside the back of the hill-shaped high wall, which along with a space in the toilet body, forms a storage space for tools.

28. The pet toilet of claim 27, wherein said container upper surface slopes down toward the inside of said container portion.

29. The pet toilet of claim 16, wherein said container upper surface slopes down toward the inside of said container portion.

30. The pet toilet according to claim 16, wherein said seat has a top side and a bottom side, and a plurality of holes in said floor which permit sand transferred to the top side of said seat to fall, through said seat bottom side to said container portion.

31. The pet toilet according to claim 16, wherein said container upper surface slopes down toward the inside of said container portion.

32. A pet toilet, comprising:
a toilet body having a body peripheral wall having an outside and an inside;
a container portion provided adjacent and separate from said inside of said body peripheral wall for containing sand, said container portion having a bottom sand-receiving area, a container peripheral wall adjacent to said bottom area and extending upward to a container upper surface defining a container upper opening; and
a seat having a floor defining a generally central seat opening which seat opening permits excreted dung or urine from a pet user to fall down into any sand placed in the container portion, said seat removably mounted on said container upper surface, and which seat can be lifted up from a first use position to a second upright position;
wherein said scat has a front portion, a central portion, and a rear portion, said seat further comprising a projecting piece located on said rear portion so that a gap is defined between said projecting piece and said central portion of said seat, said projecting piece serving as a turning fulcrum and as a support for the seat when it is lifted up from said first position to said second position; and
wherein said seat has a seat peripheral wall formed around the floor and which comprises a low wall from the center to the rear of the seat and a hill-shaped high wall gradually rising from the center to the front end, said high wall continuing with the container peripheral wall of the toilet body when the seat is mounted in said first position s that the seat is surrounded entirely.

\* \* \* \* \*